Figure 1:
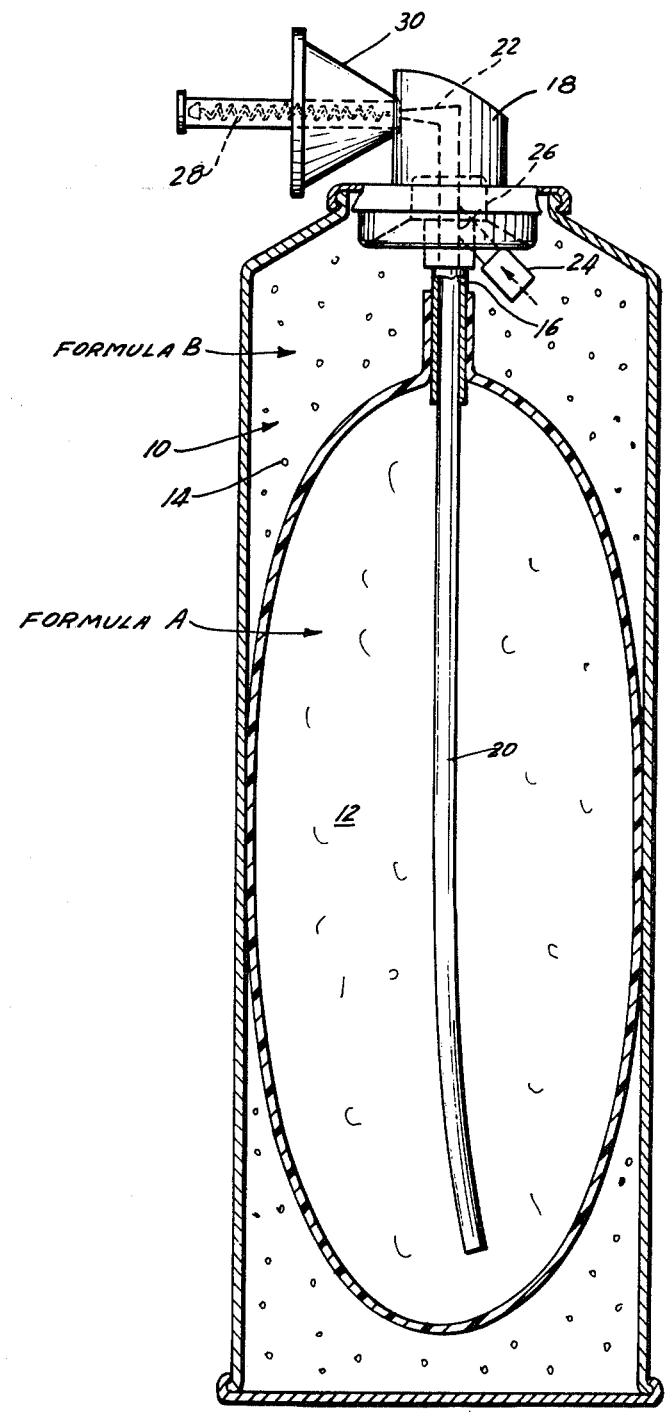

United States Patent [19]

Lazarus

[11] 3,776,775
[45] Dec. 4, 1973

[54] REMOVAL OF ICE BY A SELF-HEATING MIXTURE

[75] Inventor: Stokes Lazarus, Harrisburg, Pa.

[73] Assignee: Aeroseal Corporation, York Haven, Pa.

[22] Filed: Dec. 14, 1971

[21] Appl. No.: 207,855

Related U.S. Application Data

[63] Continuation-in-part of Ser. No. 147,822, May 28, 1971, abandoned.

[52] U.S. Cl. ............ 134/42, 126/263, 222/1, 222/94, 222/130, 222/135, 222/145, 252/70, 252/188.3, 252/193
[51] Int. Cl. ............................................. C09k 3/18
[58] Field of Search ............ 252/70, 188.3 R, 252/193; 44/3 R; 126/263; 134/42

[56] References Cited
UNITED STATES PATENTS

| | | | |
|---|---|---|---|
| 2,604,451 | 7/1952 | Rocchini | 252/51.5 |
| 2,621,648 | 12/1952 | Carfano et al. | 126/263 |
| 2,716,067 | 8/1955 | Fain et al. | 252/70 X |
| 2,918,052 | 12/1959 | Budenholzer et al. | 126/263 |
| 3,108,075 | 10/1963 | Hearst | 252/70 |
| 3,245,912 | 4/1966 | White | 252/70 |
| 3,325,056 | 6/1967 | Lewis | 222/94 |
| 3,362,909 | 1/1968 | Georgal et al. | 252/70 |
| 3,475,239 | 10/1969 | Fearon et al. | 44/3 R X |
| 3,540,623 | 11/1970 | Wittke et al. | 222/94 |
| 3,550,813 | 12/1970 | Lehmann | 222/94 |
| 3,598,103 | 8/1971 | Curtis | 126/263 X |

OTHER PUBLICATIONS

Morrison et al., Organic Chemistry, Allyn and Bacon, Inc., Boston, 1959, pp. 446, 480.
"Handbook of Chemistry," Lange ed., 8th Edition, 1952, pp. 1,616, 1,618.

Primary Examiner—Leon D. Rosdol
Assistant Examiner—Harris A. Pitlick
Attorney—Maxwell James et al.

[57] ABSTRACT

Ice is removed from a windshield or the like by spraying onto that surface an at least partially reacted mixture in droplet form of two dissimilar chemical compositions which react chemically to generate heat. The two compositions are stored in separate compartments of a dispensing container, preferably of the aerosol type, and when the dispensing valve is opened the two compositions are mixed in predetermined proportions and expelled from the container. Means may be provided in the container to control the relative flow rates of the two compositions thereby to determine the proportions in which they are mixed. Means may be provided in the valve to retain the mixed compositions in the container for a period of time sufficient to provide for a desired degree of reaction between them.

15 Claims, 4 Drawing Figures

PATENTED DEC 4 1973 3,776,775

SHEET 2 OF 2

REMOVAL OF ICE BY A SELF-HEATING MIXTURE

This application is a continuation in part of my prior application Ser. No. 147,822, filed May 2, 1971 and now abandoned and having the same title as this application.

The present invention relates to a method for removing ice from a surface such as a windshield or window, and in particular to the use of self-heating substances comprising two dissimilar chemical compositions normally disposed within a container and maintained separated from one another but co-dispensed from that container, the compositions intermixing and reacting chemically when they are thus dispensed to generate a self-heating fluid active to melt windshield ice in a safe and effective manner.

Deicing media are well known in industry especially in the automotive and aviation fields. Generally these deicing media are combinations of chemical compositions such as glycols (permanent type) and lower aliphatic alcohols (methanol type). These are found safe and effective depending upon conditions of use and environmental limitations. In the consumer automotive accessory field, it is well known to employ aerosol cans or containers of windshield deicers which containers are also used for addition to the automotive windshield washer systems.

It is one prime object of the present invention to remove windshield ice by applying to the ice-covered surface a mixture of compositions which generate sufficient heat to melt the ice without constituting a danger to the windshield or other surface.

It is another prime object of the present invention to provide a container with two compartments containing two dissimilar separated chemical compositions which upon being dispensed from the container intermix and react chemically to generate heat to produce a "self-heating" deicing fluid.

In a preferred embodiment of the invention, the dispensing container comprises an aerosol container, the aerosol valve mechanism of which is a co-dispensing valve of known construction, which upon actuation effects the expelling of the separated chemical compositions for the mixing and the chemical heat reacting thereof.

Figure 2:
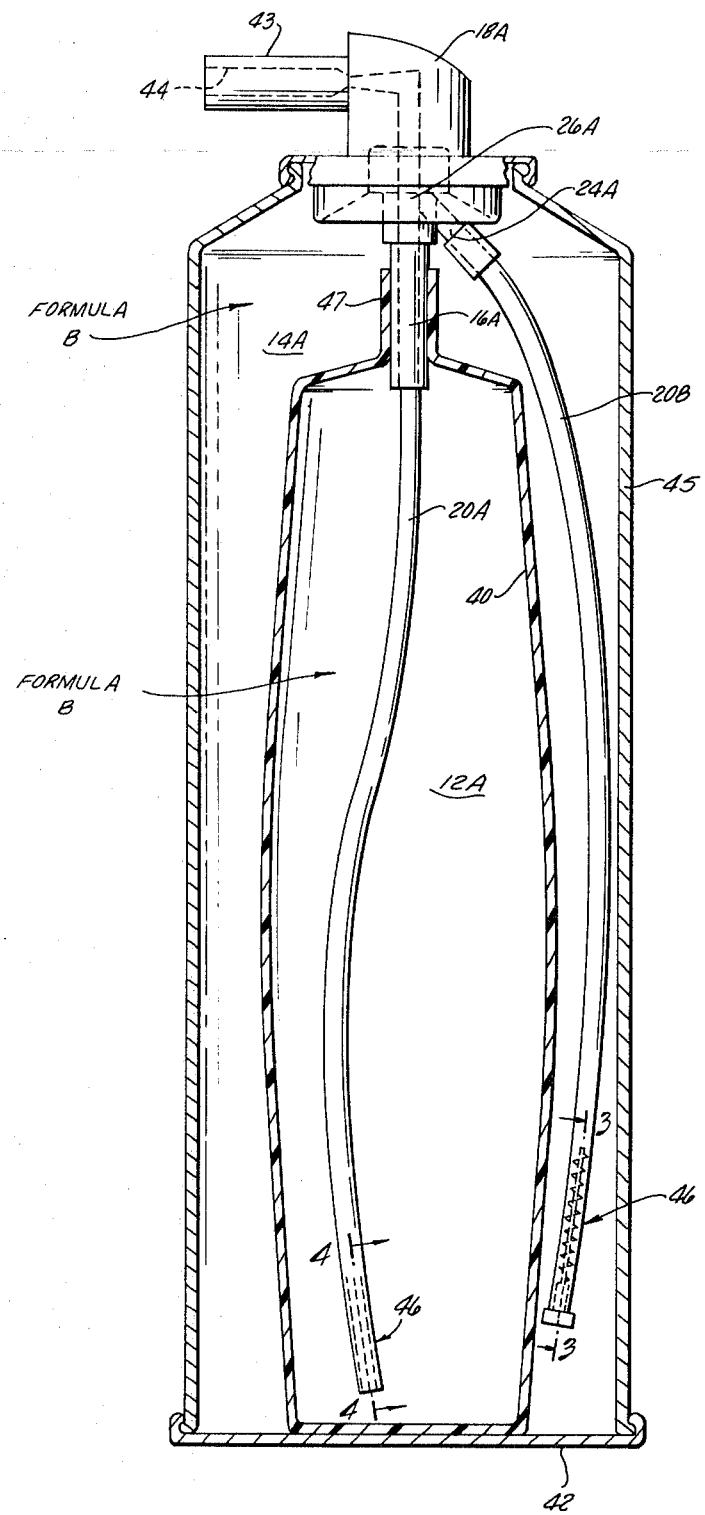
Figure 3:
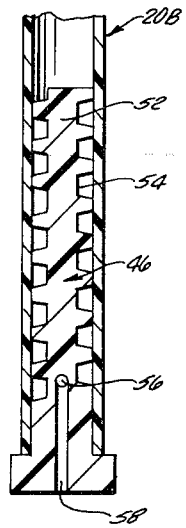
Figure 4:
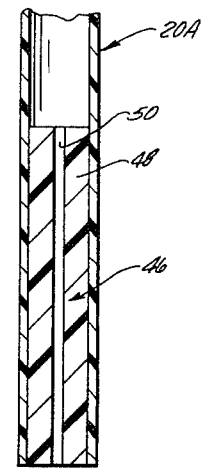

To the accomplishment of this main object and such other objects as may hereinafter appear, the invention relates to the self-heating windshield deicer as particularly defined in the appended claims considered together with the following specification and the accompanying drawing in which:

FIG. 1 is an elevational view of an aerosol container showing one embodiment of the present invention and depicting the two compartments containing the two chemical compositions employed in carrying out the principles of the invention;

FIG. 2 is a view similar to FIG. 1 but showing a second structural embodiment; and FIGS. 3 and 4 are enlarged cross-sectional detailed views taken along the lines 3—3 and 4—4 respectively of FIG. 2.

In general, two compositions, broadly designated "Formula A" and "Formula B," are selected which, when mixed together, will react and produce a significant amount of heat. These compositions are normally maintained separated from one another, but when ice melting is to be effectuated they are mixed together and then, while they are still hot from the heat of their reaction with one another, they are applied to the icy surface, preferably by being sprayed thereon in the form of droplets such as an aerosol.

Many reactions are known to be exothermic; not all of them are suitable for ice removal, and particularly ice removal from windshields or windows. There are certain obvious requirements for that type of ice removal, in particular that the compositions used and the end product of the reaction must not be harmful either to the ice-covered surface (e.g. the windshield or window) or to its surroundings (e.g., the finish of the surrounding portions of the automobile). There are in addition certain other more sophisticated requirements which effectively rule out a very large number of the reactions known to be exothermic. Thus the temperature to which the mixture is raised as a result of the exothermic reaction, while it must be sufficiently high to provide adequate amounts of heat for ice-melting purposes, must not be so high as to cause the glass or other ice-covered surface to be damaged. In addition, the ice-melting mixture should be applied to the ice-covered surface in the form primarily of a liquid and not a gas, because gases will be readily blown away or diffused by the ambient atmosphere and hence their heat will not be efficiently available for ice-melting purposes. This means that the ice-melting mixture must have a sufficiently high boiling point to permit the mixture to be applied primarily in liquid form, but it must have a sufficiently low boiling point so as not to damage the glass, as explained above.

Also of importance is the degree to which the exothermic reaction has proceeded when the mixture is sprayed onto the ice-covered surface. It is necessary that the reaction has proceeded sufficiently to produce enough heat so that the reaction will continue even after the mixture liquid has reached the ice (the ice will tend to cool it and thus minimize its reaction rate unless there is already sufficient heat present to prevent this). On the other hand the reaction should not have proceeded so far as to cause a substantial proportion of the mixture to have vaporized or boiled away. Thus it will be seen that what is involved in selecting particular compositions for use with the present invention, and in designing the means by which those compositions are mixed and dispensed, involves a compromise of many different factors. The degree to which the exothermic reaction takes place before the mixture is dispensed, and hence the degree to which the reaction continues to produce heat, can be controlled by modifying various factors — providing in the mixture substances which catalyze or speed up or slow down the reaction, and varying the time that the reacting mixture remains within the container, as by controlling the force urging the mixture out of the container or providing flow chambers or restricted passages of appropriate dimensions within the container.

There is another requirement involved. The ice-melting compositions must be kept ready for use. That means, as a practical matter, that the container therefor will be subject to the same low temperature conditions as the ice-covered surface. For example, when the mixture is to be used to remove ice from an automobile windshield, the container must be stored in the car, and if the car is subjected to temperatures low enough to cause ice to form on the windshield the container of ice-melting compositions will be subjected to the same low temperature. Consequently the compositions involved must be able to withstand those low temperatures without themselves solidifying. They must, in other words, have a sufficiently low freezing point so that they will be ready for use when they are needed, that is to say, when the temperature is very low.

The two compositions must be kept separated until they are ready to be mixed and means must be provided for feeding both of those compositions to the point where they are mixed and then expelling the mixture from the container. While separate propelling means could be provided for each of the compositions, this is unduly expensive and would cause great complication in the filling of the containers. Accordingly, it is preferred that there be a flexible wall separating the two compositions, and that one of those compositions comprise a propellant, preferably of the gaseous or gas-producing type, which acts on the other composition through the flexible wall, so that said single propellant provides the feeding force for both compositions. This, however, presents another problem — the wall separating the two compositions must be immune to attack from either of the compositions and from the propellant. High density ethylene has been found to be particularly effective insofar as its resistance to attack is concerned, but that substance is rather stiff, strongly resists deformation, and thus a propellant at high pressure is required. It has been found that nitrous oxide is particularly suitable in this regard, because it is relatively inexpensive, can be used to produce the necessary propellant pressures, and does not itself attack the polyethylene of the separating wall.

The nature of the reaction between the two compositions, and particularly the degree to which maximum advantage is taken of its heat-producing capabilities, is in part dependent upon the proportions of the two compositions as they are mixed. Proper proportioning of those compositions can readily be achieved by providing appropriately dimensioned feed paths for the two compositions respectively as they pass from the container proper to that section of the valve where they are mixed. The use of elongated, narrow and/or tortuous passages of predetermined length will, in conjunction with known ranges of propellant pressure, control the relative rates of flow of the two compositions sufficiently accurately to produce the desired proportioning result.

In the embodiment illustrated in FIG. 1, an aerosol can generally designated as 10 is provided or formed with two compartments 12 and 14 for containing two separated chemical compositions indicated respectively as "Formula A" and "Formula B," Formula A being contained in the compartment 12 and Formula B being contained in the compartment 14. In the container illustrated in FIG. 1 the compartment 12 comprises a plastic or elastic bag which is affixed at its mouth to the body projection 16 of the actuator valve 18 forming part of the aerosol container 10 and tightly sealed thereto to prevent leakage. The actuator valve is of a well known type of co-dispensing valve.

In the construction illustrated in FIG. 1 the Formula B in the compartment 14 may include a gas such as ammonia gas, surrounding the elastic bag 12, exerting a pressure thereon which causes its contents to be expelled upon depressing the actuator valve 18. The plastic bag 12 is provided with a semi-rigid dip tube 20 which, as shown, extends beyond the mouth of the elastic bag through the stem of the actuator valve terminating in an exit opening 22. In the compartment 14 of the aerosol container there is provided a tube 24 having an entrant opening in the compartment 14 which is attached at 26 to the dip tube 20 for communication therewith. With this recited construction, depressing the actuator valve 18 produces a flow of both chemical compositions (Formula A and Formula B) into the exit end 22 of the dip tube 20, there effecting the intermixture of the two chemical compositions. As the container is exhausted, the plastic bag 12 collapses around the dip tube 20.

The aerosol container 10 is also provided with a mixing adapter device generally designated 28 connected as an extension to the discharge actuator valve 18, the said mixing adapter device 28 preferably comprising a helical or spiraled tube.

This adapter device 28 provides a sufficiently elongated, narrow and convoluted discharge path for the mixed compositions as to delay the exit of the mixture from the adapter device 28 until the reaction between the compositions has proceeded to a desired degree. Because the heat-producing mixture is retained within the adapter device 28 for an appreciable period of time, the walls of that device themselves become heated, and this in turn facilitates the reaction between the two compositions when they enter the adapter 28. The type of exit control provided by the adapter 28, which involves retaining the mixture therewithin for an appreciable period of time, will be applicable for compositions which when mixed react relatively slowly, or in those specialized instances where it may be desired that the mixture or a substantial portion thereof boil or vaporize before it reaches the outside atmosphere. A heat shield 30 may be placed surrounding the spiraled discharge adapter 28 to protect the user against the heat of that adapter 28, and from having the expelled mixture blown back against the hand of the user by wind.

In all of the examples given herein, the proportions or parts are by weight unless otherwise indicated.

Example I: With the aerosol can or container depicted in the FIG. 1 of the drawings, one may employ for the "Formula A" a liquid solution of formaldehyde and water and for "Formula B" a gaseous ammonia with a co-solvent liquid to reduce its vapor pressure, the products of the reaction being hexamethylenetetramine and heat. Upon actuation of the aerosol valve, propellant force is supplied at a working pressure of from 20 psi to 80 psi, depending upon ambient environmental temperature of the container. The chemical reaction which occurs upon the mixing of the two chemical compositions for this example can be seen from the following indicated equations:

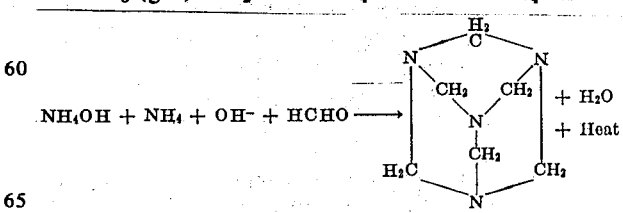

This reaction has many advantages over other heat-producing chemical reactions in terms of toxicity, amount of heat available, cost of materials, error-variance of blending ratios, non-damaging characteristics of reactant products to surfaces, non-corrosive characteristic of ammonia on tinplate, and commercial availability of low-cost raw materials.

In this embodiment of the chemical formulas, methanol or other lower aliphatic alcohols is added to the formaldehyde, which has the beneficial effect of the prevention of the formation of paraformaldehyde, a polymer and non-liquid; the prevention of the freezing of Formula A under conditions of storage and use; and in addition methanol acts as a cleaning solvent and deicing fluid at the surface treated, while at the same time methanol lowers the boiling point of the chemical reaction and in doing so prevents the cracking of glass under extreme temperature differentials.

The effective range of the formulation described above is as follows:

| | |
|---|---|
| $NH_3$ (gas) | 3% to 25% |
| HCHO | 4% to 55% |
| Water | 0% to 40% |
| Methanol | 0% to 80% |

With the preferred embodiment:

| Formula A | Formula B |
|---|---|
| 24% HCHO | 100% $NH_3$ |
| 16% $H_2O$ | |
| 60% [$CH_3OH$ — a surfactant] | |

With the construction of the aerosol container shown in FIG. 1 of the drawings, the relative dimensions of the dip tube 20 and the tube 24 are selected to be such that the mixing proportions of the Formula A and Formula B are substantially as follows:

82% Formula A - 18% Formula B.

In other embodiments of the invention, Formula B may be made to comprise ammonia liquid or amine organic derivatives in a liquid form. (The designation "ammonia" or "$NH_3$" in the specification and claims hereof being used generically to include ammonium in gaseous form, ammonia in combination with water (ammonium hydroxide) and various amines such as ethylenediamine, diethylenetriamine and triethylenetetramine), the container being pressured with an aerosol propellant such as nitrous oxide or hydrocarbon or other standard aerosol propellants. In such cases the tube 24 would have a dip tube connected thereto in a manner to allow liquid flow or gaseous flow of the contents of compartment 14.

In these other embodiments of the invention the two compositions contained separately in the container compartments corresponding to compartments 12 and 14 would comprise the following:

Example II: Acetic acid and ethylene diamine which upon dispensing and mixing produce the following heat-generating reaction:

$$CH_3COOH + (C_2H_6)(NH_2)_2 \rightarrow Heat$$

Example III: Phosphoric acid and morpholene which produces the following heat-generating chemical reaction:

Example IV: An acid mixture and hydrazene which upon dispensing and mixing produce the following heat-generating reaction:

Example V: A non-ester forming mixture and ammonium hydroxide, etc. which will produce the following chemical reaction:

$$CH_3COOH + CH_3OH + H_2O + NH_4OH \rightarrow Heat$$

Example VI: Acetic anhydride and ammonium hydroxide in the presence of $CH_3OH$ which will produce the following chemical reaction:

In addition, tests were successfully run with up to 3% ethylene glycol added to the formulations with satisfactory results. It was found that small amounts of glycol enhanced the deicing characteristics without smearing the windshield. Various surfactants were added with product enhancement indications. In the preferred embodiment a one-fourth percent addition of various surfactants was made to Formula A.

A particularly favorable combination of substances generally corresponding to Example VI consists of the following: For Formula A, 100 percent acetic anhydride. For Formula B, a combination of ammonia, water, methanol, and butyl glycol ether, these substances being present in proportions by weight within the following ranges:

| | |
|---|---|
| Ammonia | 2 – 15% |
| Water | 25 – 75% |
| Methanol | 10 – 50% |
| Butyl Glycol Ether | 0 – 5 |

Preferred proportions are as follows:

| | |
|---|---|
| Ammonia | 12% |
| Water | 52% |
| Methanol | 35% |
| Butyl Glycol Ether | 1% |

Combined with this formulation is a suitable propellant, such as nitrous oxide. The relative proportions of propellant and composition mixture may be widely varied, with an upper limit defined in essence by the strength of the container for the overall combination and a lower limit defined in essence by the resistance to deformation of the inner container and the flow resistance characteristics of the formulae involved. For normal commercial applications, the propellant can be present in proportions by weight between 1 and 6 percent based upon the propellant-composition mixture combination, with a value of 2 percent in the case of nitrous oxide serving to provide adequate propelling properties even when subjected to low temperatures.

Acetic anhydride constitutes a desirable reactant because it will produce significantly more heat per unit weight than comparable reactants (acetic acid, for example), it has a desirably low freezing point, thus permitting the finished product to function properly even when stored at temperatures below 0°F, and it has a relatively low molecular weight, thus facilitating an efficient proportioning of the various other components.

The water used in Formula B absorbs the ammonia, which is the ingredient which reacts with acetic anhydride. In addition, the water raises the boiling point of methanol, thus minimizing the tendency of that substance to vaporize and escape before it can enter into reaction, and it has a higher specific heat than methanol, thus enabling a given volume of mixed substance to bring to the windshield a greater amount of heat.

The presence of water also lowers the tendency of the system to absorb nitrous oxide, thus permitting the nitrous oxide to be injected into the container by means of a pressure filling step on an in-line production basis. The water further renders the finished product nonflammable, thus adding to safety, an exceedingly important point because it enables the mixture to be stored and sprayed onto ice in virtually any environment without danger. Furthermore, by modifying the density and increasing the fluidity of Formula B, it facilitates the mixing of Formulas A and B by means of a co-dispensing valve.

The methanol lowers the freezing point of the mixture so that it can remain liquid even though subjected to low temperatures. In and of itself it is a deicing agent, often used as such. The presence of methanol also lowers the boiling point of the water, producing a final mixture which boils at a temperature (e.g. 150°F) low enough so that the glass of a window or windshield will not be damaged thereby. The methanol absorbs nitrous oxide sufficiently so that a satisfactory amount of active nitrous oxide will be present in the dispensing container even as the contents of the container are depleted. The methanol further acts as a catalyst, speeding up the reaction of the ammonia and acetic anhydride.

The ammonia, in addition to defining the ingredient reactive to acetic anhydride, inhibits corrosion of the metal container, and lowers the freezing point of composition B. It is a particularly desirable component because of its low cost. It is present in such small proportions that the sprayed mixture is not caustic to any appreciable degree.

The butyl-glycol ether, specifically mentioned above, is but one of many glycol-type antifreeze agents, often used as such, which can be embodied in small proportions in Formula B with good effect. In addition to improving the antifreeze properties of the reacted mixture, it also tends to couple with methanol, slowing down the evaporation of methanol from the end product and thus helps to maintain the end product at the high temperature which melts ice.

FIGS. 2–4 illustrate an aerosol-type dispensing apparatus particularly well suited for use with the type of formulation under discussion. Its inner compartment 12A is defined by a semirigid container 40 formed of some suitable deformable plastic. Polyethylene, and particularly high density polyethylene, is exceptionally suitable in that regard because of its resistance to stress cracking and its very effective barrier properties. The jar rests on the bottom wall 42 of the outer metal container 45, with the neck 47 of the jar being sealingly telescoped over the body projection 16A of the actuator valve 18A. The space between the outer container walls 42–45 and the jar 40 defines the outer compartment 14A, Formula A being received in compartment 12A and Formula B being received in compartment 14A. Since both Formula A and Formula B are liquid, dip tubes 20A and 20B are provided which extend into the compartments 12A and 14A respectively, the dip tube 20A communicating with the valve projection 16A and the dip tube 20B communicating with the valve tube 24A, the material flow paths of which dip tubes 20A and 20B meet in valve 18 at 26A, the mixed materials then flowing through the valve 18A to an exit element 43 having a fairly large chamber 44 therein, having an inner diameter of perhaps 0.150 inch which defines an expansion chamber constituting the exit means from the dispensing can and valve. This expansion chamber 44 is used with reacting mixtures of the type here specifically disclosed in conjunction with Example VI, instead using the mixing adapter device 28 of FIG. 1 (which typically has an inner diameter of about 0.060 inch), because with mixtures of the type here under discussion the reaction rate is relatively rapid, and if the reacting mixture were to be retained in the valve for an appreciable period of time, as is the case when the mixing adapter device 28 is employed, the reaction will have gone substantially to completion before the reacting mixture leaves the valve. Hence that mixture may well have boiled to an appreciable degree, and the gaseous products of the boiling will tend to dissipate and not remain on the surface onto which they were sprayed. It is better if hot liquid is sprayed onto the surface to be cleared of ice, since that hot liquid will more reliably transfer its heat to the device for melting purposes. It is also better if that liquid is sprayed onto the ice in the form of relatively larger droplets rather than relatively small droplets. The ultimate objective, of course, is to deliver to the ice a maximum amount of heat over a maximum amount of time, thereby to produce a maximum amount of melting. The use of the expansion chamber 44 results in a mixture being sprayed which is substantially completely in liquid form, with the droplets relatively large, with the reaction having proceeded to a substantial degree, with some of the reaction preferably still taking place after the material has been deposited onto the ice to be melted, and with enough of the reaction having occurred before the material is deposited on the ice that the low temperature of the ice will be ineffective to inhibit the completion of the reaction. The fact that the reaction takes place to an appreciable degree in the expansion chamber 44 (or in the mixing adapter 28) results in the walls of those elements quickly becoming heated, thereby to encourage reaction of subsequent units of the reacting mixture.

The dimensions of the expansion chamber 44 will depend upon the particular substances involved, the relative proportions of those substances, and the force with which those substances tend to be expelled from the container, the last factor in turn being controlled by the nature and amount of propellant provided. In addition, the relative rates of flow of Formulas A and B, and hence the proportions of those substances which are operatively mixed together, may be controlled by providing in the dip tubes 20A and 20B for Formulas A and B respectively, flow control means generally designated 46, these flow control means 46 so limiting the size, length and shape of the flow passages for the respective formulas as to give rise to the desired mixture proportions as well as the desired flow rate for a given propellant pressure. As may best be seen in FIG. 4, the flow control means 46 for the dip tube 20A comprises an insert 48 sealingly inserted in the lower tip of that tube and having a passage 50 therethrough. As may best be seen in FIG. 3, the flow controlling means 46 disposed at the end of dip tube 20B comprises an insert 52 sealingly received in the lower end of that tube and having a helically threaded outer surface 54 which communicates at 56 with a short passage 58 extending to the lower tip thereof. By modifying the lengths, diameters and shapes of the flow paths provided by the means 46 in accordance with the flow characteristics of the particular Formulas A and B which may be used, desired proportionality and flow rates are achieved. As here specifically shown, and in connection with the acetic anhydride-ammonia-methanol system described above, the insert 48 through which Formula A (acetic anhydride) flows, has a passage 50 which is 2-½ inches long and has an inner diameter of about 0.032 inch, this being of capillary size relative to the substance involved. The insert 52 defines with the inner surface of dip tube 20B a convoluted passage having an internal diameter of about 0.060 inch, making about 10 spiral turns, and having an axial length of about 1-½ inches. These parameters will vary, of course, with variations in propellant pressure, expected ambient conditions, fields of use, and specific compositions.

While mention has been made of the use of ammonia in Formula B, it must be borne in mind that various organic amines may be substituted for part or all of the ammonia, this being particularly desirable where avoidance of undesirable odor is sought. Among such amines are ethylenediamine, diethylenetriamine and triethylenetetramine. These amines not only reduce the likelihood of offensive odor but also reduce the probability of high entropy change which might otherwise result from the presence of excess ammonia in the effluent. Furthermore, because these amines have relatively high boiling points, their use results in the formation of larger aerosol particles and the reduction in the tendency of the mixture to boil away, thus increasing the efficiency of heat application to the ice to be melted. They also have conventional antifreeze characteristics, which are desirable.

The self-heating windshield deicer of the invention, the functioning thereof and the use advantages thereof will be fully apparent from the above detailed description. In all of the examples the container, preferably an aerosol container, is provided with two compartments 12 and 14 separately containing two dissimilar chemical compositions which upon actuation of a co-dispensing valve of the aerosol container intermix and react chemically to generate heat at the proper temperature to melt ice on a windshield in a safe and effective manner. The aerosol container is provided with a mixing actuator which not only controls the temperature of the mixture at the emitting surface of the container below the boiling point of the mixture but by which, should an inexact blending occur because of any failure of the valve mechanism to proportion the separate compositions properly, the discharge will be non-noxious and within safety limitations in outdoor areas.

In the various embodiments methanol or other lower alcohols as well as lower glycols such as ethylene glycol may be used in compounding the formulation to produce a composition which will not freeze at 32°F. and below, either on container storage or after usage, or on the deiced surface, after the reactants have cooled; such an additive effects (a) a lowering of the freezing point of the reactant (b) the prevention of polymerization and (c) a lowering of the boiling point of the discharge. In the examples given, one or both of the reactant fluids have a flash point above 60°F. and an explosive limit above 8 percent concentration in air.

Reference has been made in Example VI and in other specific embodiments thereof to use of acetic anhydride as one of the constituents. The lower molecular weight homologues of acetic anhydride, such as propionic anhydride and butyric anhydride, can be used to replace some or all of the acetic anhydride in those examples, and consequently the term "acetic anhydride" as used in the specification and in the claims, is meant to include such lower molecular weight homologues in addition to acetic anhydride itself.

It will also be apparent that changes may be made in the structure of the container or in the selection of equivalent reactants which function in substantially the same manner as described herein without departing from the spirit of the invention defined in the following claims.

I claim:

1. The method of removing ice from a windshield or other surface comprising the steps of (A) providing two separated dissimilar chemical compositions in a dispensing container which, when mixed, react with one another to produce a significant amount of heat, said two compositions respectively consisting essentially of (a) a compound selected from acetic anhydride and acetic acid and (b) a blend of 2-15 percent, by weight, ammonia, 25-75 percent, by weight, water and 10-50 percent, by weight, methanol; (B) mixing said compositions (a) and (b) in relative proportions, by weight, of about 1:2-7 and causing them to at least partically react; and (C) spraying said at least partially reacted mixture in droplet form onto said surface.

2. The method of claim 1, in which said mixture, when sprayed in step (C), is only incompletely reacted.

3. The method of claim 1, in which said mixture, when sprayed in step (C), is at a temperature below its boiling point.

4. The method of claim 1, in which said components of composition (b) are present in the following proportions by weight:

| | |
|---|---|
| Ammonia | About 12% |
| Water | About 52% |
| Methanol | About 35% |

5. The method of claim 1, in which said compositions (a) and (b) are present in relative proportions by weight of about 1:4.

6. The method of claim 4, in which said compositions (a) and (b) are present in relative proportions by weight of about 1:4.

7. The method of claim 1, in which steps (A), (B) and (C) are carried out by means of a pressurized aerosol dispenser.

8. The method of claim 1, in which composition (a) consists essentially of acetic anhydride and composition (b) further comprises a propellant.

9. The method of claim 1, in which composition (a) consists essentially of acetic acid and composition (b) further comprises a propellant.

10. The method of claim 8, wherein said propellant is present in a concentration of from about 1-6 percent, by weight.

11. The method of claim 9, wherein said propellant is present in a concentration of from about 1-6 percent, by weight.

12. The method of claim 10, in which said components of composition (b) are present in the following proportions by weight:

| | |
|---|---|
| Ammonia | About 12% |
| Water | About 52% |
| Methanol | About 35% |
| Propellant | About 1% |

13. The method of claim 11, in which said components of composition (b) are present in the following proportions by weight:

| | |
|---|---|
| Ammonia | About 12% |
| Water | About 52% |
| Methanol | About 35% |
| Propellant | About 1% |

14. The method of claim 10, in which said components of composition (b) are present in the following proportions by weight:

| | |
|---|---|
| Ammonia | About 12% |
| Water | About 52% |
| Methanol | About 35% |

15. The method of claim 11, in which said components of composition (b) are present in the following proportions by weight:

| | |
|---|---|
| Ammonia | About 12% |
| Water | About 52% |
| Methanol | About 35% |

* * * * *